US006634777B1

(12) United States Patent
Trimpe et al.

(10) Patent No.: US 6,634,777 B1
(45) Date of Patent: Oct. 21, 2003

(54) MOLDED RETENTION FEATURES FOR INTERNAL MOVABLE REFLECTOR LAMPS

(75) Inventors: Kenneth L. Trimpe, Pendleton, IN (US); Joseph C. Ballman, Anderson, IN (US)

(73) Assignee: Guide Corporation, Pendleton, IN (US)

(*) Notice: Subject to any disclaimer, the term of this patent is extended or adjusted under 35 U.S.C. 154(b) by 0 days.

(21) Appl. No.: 10/131,434

(22) Filed: Apr. 24, 2002

(51) Int. Cl.[7] .................................................. B60Q 1/00

(52) U.S. Cl. ....................... 362/519; 362/549; 362/548; 362/226; 313/318.11; 313/318.03; 313/113

(58) Field of Search ................................ 362/226, 549, 362/548, 519, 546, 345; 313/318.01, 318.03, 318.11, 113

(56) References Cited

U.S. PATENT DOCUMENTS

| | | | | |
|---|---|---|---|---|
| 4,019,045 A | | 4/1977 | Bassett | |
| 4,682,274 A | | 7/1987 | Freudenreich et al. | |
| 4,747,029 A | | 5/1988 | Liverance et al. | |
| 4,760,506 A | | 7/1988 | Mochizuki et al. | |
| 4,774,645 A | * | 9/1988 | Iwamoto | 362/226 |
| 4,819,142 A | | 4/1989 | Lothamer et al. | |
| 4,922,388 A | | 5/1990 | Freudenreich | |
| 4,969,072 A | | 11/1990 | Pye | |
| 5,010,455 A | | 4/1991 | Luallin et al. | |
| 5,361,191 A | | 11/1994 | Matsuzaki et al. | |
| 5,446,638 A | * | 8/1995 | Matsuzaki et al. | 362/341 |
| 5,626,413 A | | 5/1997 | Ferrell | |
| 5,855,430 A | * | 1/1999 | Coushaine et al. | 362/519 |
| 6,000,814 A | | 12/1999 | Nestell et al. | |
| 2002/0159273 A1 | * | 10/2002 | Erion | 362/547 |

* cited by examiner

*Primary Examiner*—Sandra O'Shea
*Assistant Examiner*—Hargobind S. Sawhney
(74) *Attorney, Agent, or Firm*—Brian T. Ster; Russell E. Fowler, II; Ice Miller

(57) ABSTRACT

A movable reflector with integrally molded bulb assembly retention features. The movable reflector comprises a bore at the center of the reflector for receiving a bulb assembly and retention features integrally molded on the rear side of the reflector to retain the bulb assembly. The movable reflector further comprises mold voids spaced around the bore adjacent to the retention features and extending through the movable reflector so that the structure of the retention features and the movable reflector may be molded in one injection molding step without additional tool movement.

18 Claims, 10 Drawing Sheets

MOLDED RETENTION FEATURES FOR INTERNAL MOVABLE REFLECTOR LAMPS

BACKGROUND OF THE INVENTION

This invention relates generally to automotive lamps. More specifically, the present invention relates to bulb retaining arrangements for releasably retaining a replaceable light bulb assembly in a headlamp.

Modern automotive headlamps are composite assemblies that come in two general types, reflector aimable and housing aimable. In reflector aimable, or movable reflector, construction, only a reflective component is moved with respect to the housing, which remains fixed to the vehicular body. In contrast, the entire lamp unit is pivoted with respect to the vehicular body in housing aimable construction. Nonetheless, both constructions typically include the same primary components, a housing portion having an open end, a light diffusing lens portion affixed to the open front of the housing, and a light bulb. The primary structural difference between the two categories of lamps is the primary reflective element in which the bulb is retained.

In housing aimable headlamps, the housing is the primary reflector and is thus formed with a parabolic reflecting surface and a bulb retaining arrangement located around a center bore at the substantial center of the housing for receiving a light bulb assembly. The retaining arrangement is adapted to maintain the bulb in a predetermined position relative to the socket and the reflecting surface while ensuring a watertight seal around the socket. In reflector aimable headlamps, the housing is not the primary reflector. Instead, an internal reflector, adjustably mounted within the housing, performs that function. Accordingly, the bulb is not retained by the housing but rather by the internal reflector. Thus, in reflector aimable lamps, it is the internal reflector, not the housing, which includes the bulb retention arrangement.

A conventional retention arrangement for a housing aimable headlamp is disclosed in U.S. Pat. No. 5,010,455 to Luallin et al ("Luallin"). The arrangement includes three separate arcuate and circumferentially spaced retainer sections surrounding the socket opening. Referring to FIG. 1 of Luallin, each of the retainer sections comprises a pair of axially extending legs integrally formed with the rear of the reflector 12. A bridge member 46 interconnects the legs of each of the retainer sections and has ramp portion 48 formed thereon. In addition, each of the retainer sections is formed with a cutout portion 50 for receiving one of the ears 30, 32, 34 of the light bulb assembly. Also, at least one of the retainer sections has a stop surface. When the ears of the light bulb assembly are inserted into the cutout portions and the light bulb assembly is rotated, the ears initially contact the ramp of each bridge member. This causes the associated bridge member to flex axially outwardly relative to the circular opening. Upon continued rotation of the light bulb assembly one of the ears engages the stop surface after which the bridge member of each of the retainer sections serves to press the light bulb assembly inwardly towards the circular opening to orient the filament of the light bulb axially with respect to the reflecting surface.

Bulb retention arrangements of this type are typically manufactured via injection molding. Injection molding is a common fabrication process in which polymers ("plastics") are injected into a hollow mold cavity under high pressure. Through this cyclical process identical parts are produced. A typical injection molding cycle consists of the following steps:

melting of plastic resin;

injection of melted plastic resin into the mold;

cooling of the mold; and ejecting the molded workpiece.

Injection molding offers several advantages in fabrication. Perhaps most significant, injection molding yields a high production rate of substantially uniform parts. Further, the process requires relatively little labor and is thus more economical on average than other production methods.

Retention arrangements of the type disclosed in Luallin provide superior bulb retention and a watertight seal. Further, their integral relation to the rear of the housing allows for economic manufacture via injection molding. However, this type of retention arrangement also has several distinct disadvantages. One significant disadvantage is that the design features of such retention arrangements, characterized by multiple passages and structures lying in differing planes, require relatively complicated tools to manufacture. More importantly, however, is that to form this type of retention arrangement, tool action is necessary. Indeed, additional steps must be performed on each workpiece. First, the housing must be molded. Then, after the mold is opened, a second operation is required wherein a second set of tooling must act on the workpiece to form passages such as those between the rear surface of the reflector and resilient ramp portions. As each step in a manufacturing process increases cost and increases the possibility of error, these multiple steps result in increased costs and decreased quality.

Additionally, the tooling process is further complicated by the fact that a watertight seal is necessary between the lamp and the housing. Thus, additional openings in the housing, which might otherwise simplify the tooling process, cannot be introduced if the necessary watertight seal is to be maintained. Nonetheless, these problems have been tolerated because the retention assembly of this type provides desired bulb retention and a watertight seal. However, in headlamps of the reflector aimable type, where a watertight seal between the lamp and the reflector is not necessary, these disadvantages need to be overcome.

Therefore, it is desirable to provide a bulb retention assembly which provides adequate bulb retention in a headlamp of the reflector movable type. It is further desired that such a retention assembly be designed so as to be injection molded in one step with relatively simple tooling and without tool movement. Finally, it is also desired that such an assembly not be overly complex or expensive to manufacture.

BRIEF SUMMARY OF THE INVENTION

The present invention comprises a reflector for use in a reflector aimable, also known as a movable reflector, vehicle headlamp assembly. The present invention is for use in conjunction with a replaceable light bulb assembly commonly known in the art, with the replaceable light bulb assembly having at least one tab projecting radially outwardly from a socket portion thereof. The present invention comprises a reflector having a front side and a rear side, and a molded body with a bore through the approximate center of the reflector. The bore is suitably positioned and sized for accepting the replaceable light bulb assembly from the rear side of the reflector.

The reflector of the present invention further comprises at least one retainer section integrally molded on the rear side of the reflector and arranged adjacent to the bore. While many embodiments of the present invention are possible and intended to fall within the scope of the claims appended hereto, the exemplary embodiment described herein comprises three retainer sections. Each of the retainer sections comprises a cutout portion, a ramp and a stop feature molded therein. When the replaceable light bulb assembly is inserted into the bore and is rotated, each of the cutout portions of the retainer sections accept the tabs located on the socket portion of the replaceable light bulb assembly. Upon further rotation of the replaceable light bulb assembly, the tabs are then frictionally retained between the ramps and the body of the reflector, with the stop features ensuring that the replaceable light bulb assembly is rotated into proper position.

The reflector of the present invention further comprises mold voids through the reflector which are aligned with the retainer sections. In the exemplary embodiment, three such mold voids are present. The three mold voids are circumferentially spaced around the bore and are generally aligned with the three retention sections. The mold voids are suitably positioned and sized to allow the reflector and the integrally formed retainer sections to be molded in one injection molding step.

DETAILED DESCRIPTION OF THE INVENTION

The present invention comprises a bulb retention solution for use in headlamp assemblies with aimable or movable reflectors where a watertight seal is not required. Specifically, the present invention is a movable reflector with integrally molded bulb assembly retention features. The present invention utilizes voids spaced around the socket bore and extending through the movable reflector and aligned with the retainer sections so that the structure of the retention features and the movable reflector may be molded in one injection molding step without additional tool movement to finish the retention features.

Figure 1:
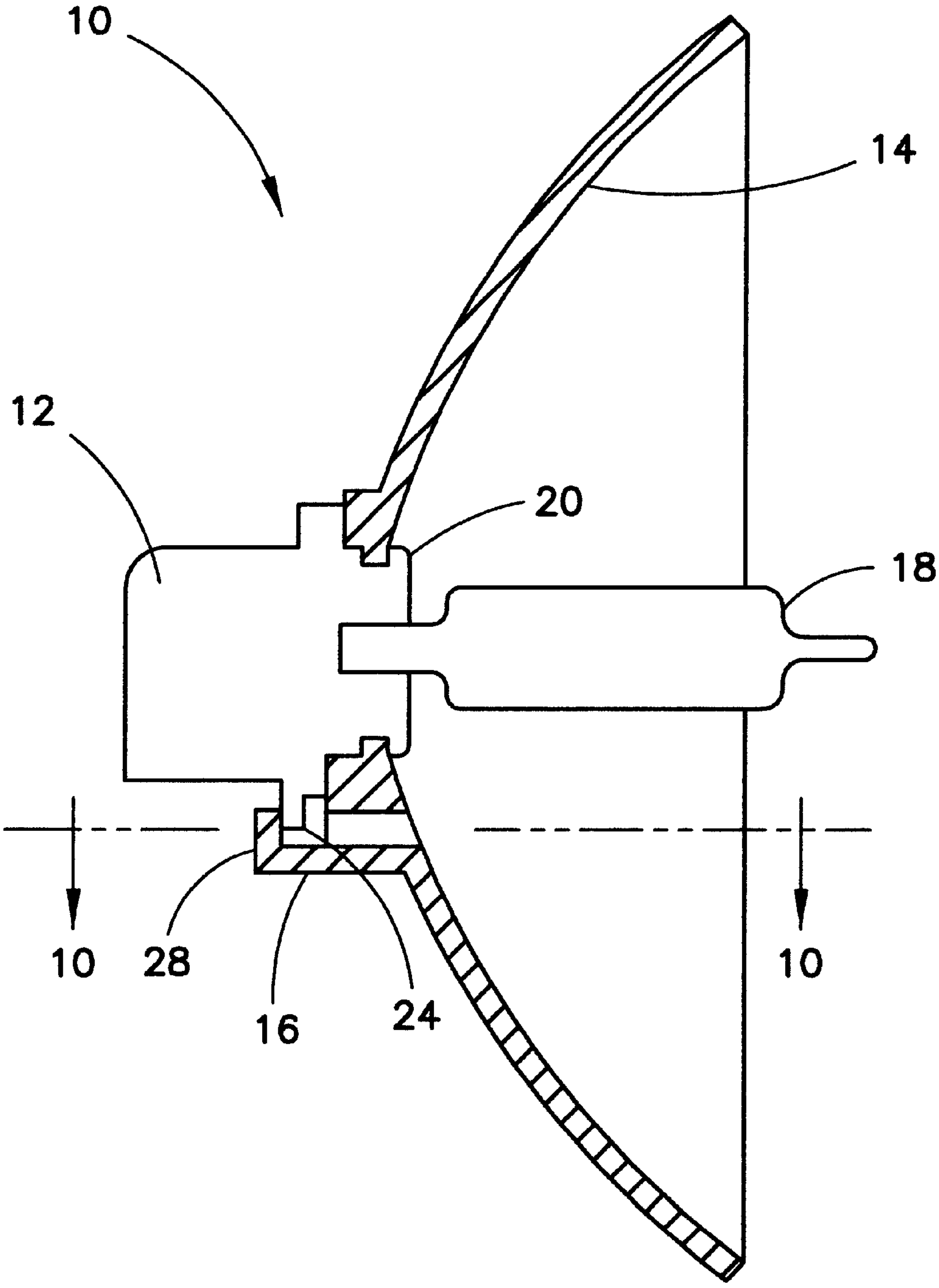
FIG. 1 is a side cross-sectional view of one exemplary embodiment of the present invention with a bulb assembly installed taken substantially along line 1—1 of FIG. 5.
Figure 2:
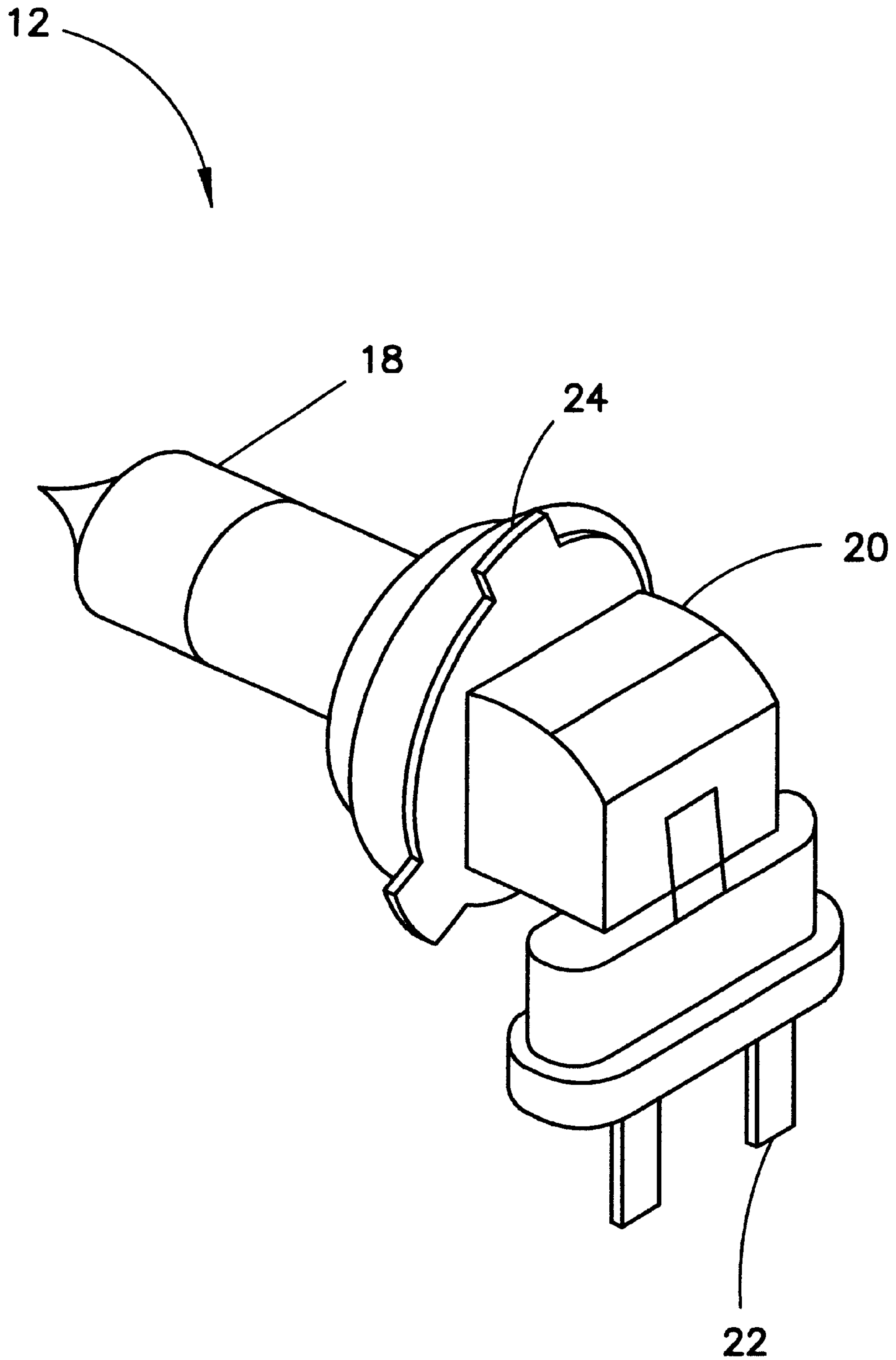
FIG. 2 is a rear perspective view of a bulb assembly of the type which may be used in conjunction with the present invention.
Figure 5:
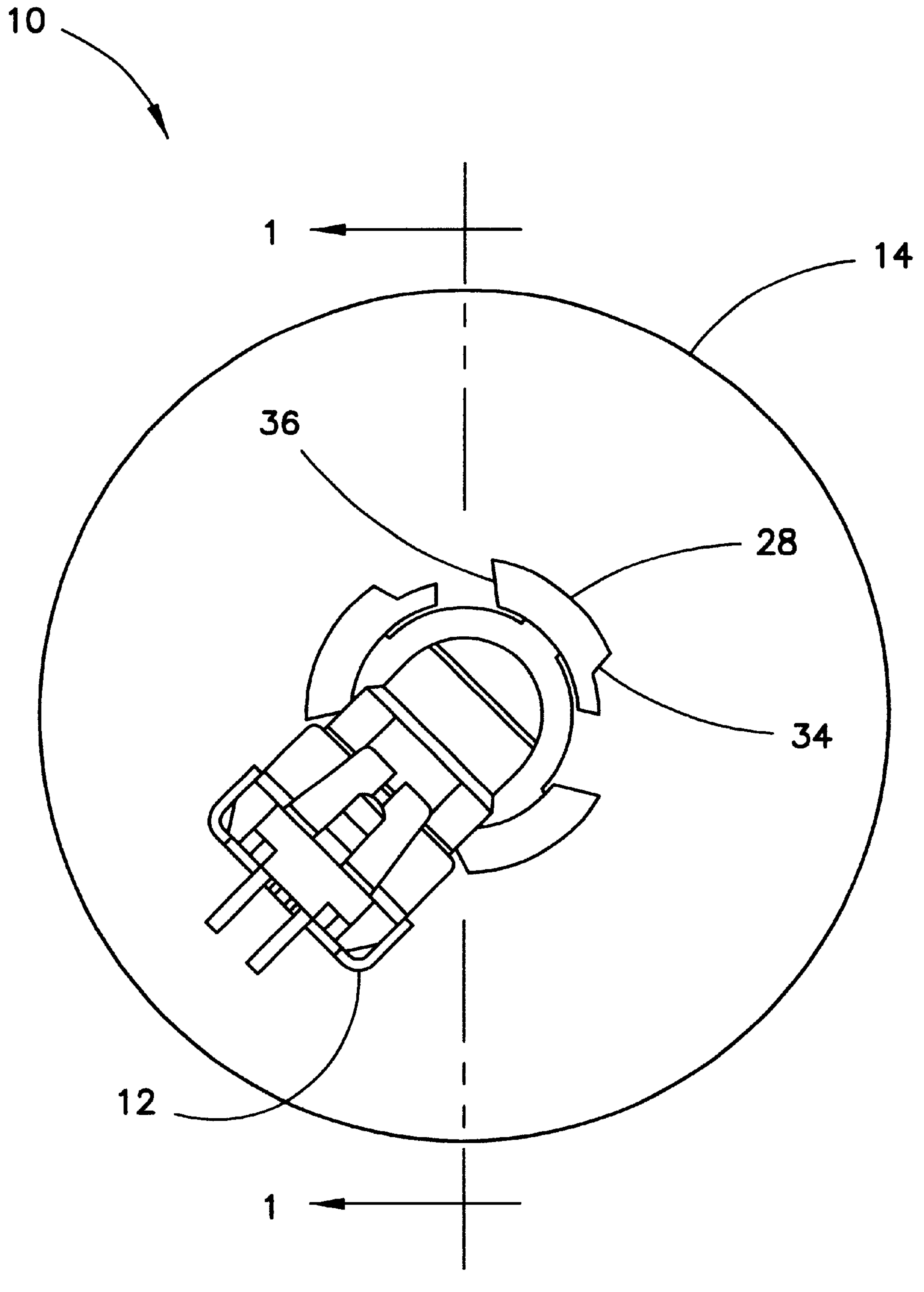
FIG. 5 is a rearview of the exemplary embodiment of FIG. 1 after the bulb assembly has been fully rotated into place.

In FIG. 1, there is shown a side cross-sectional view of an exemplary embodiment of the present invention taken along line 1—1 in FIG. 5. Headlamp assembly 10 comprises a housing (not shown), a lens (not shown), a bulb assembly 12, and a movable reflector 14. Movable reflector 14 further comprises molded retention arrangement 16. As shown in FIG. 1 and FIG. 2, bulb assembly 12 includes bulb 18, socket portion 20, terminals 22, and tabs 24 circumferentially spaced around socket portion 20 of bulb assembly 12. Bulb assembly 12 may be any suitable replaceable light bulb/socket combination assembly known to those skilled in the art for use in movable reflector headlamps and which contains circumferentially spaced tabs 24 for engaging retention arrangement 16 of the present invention.

Figure 3:
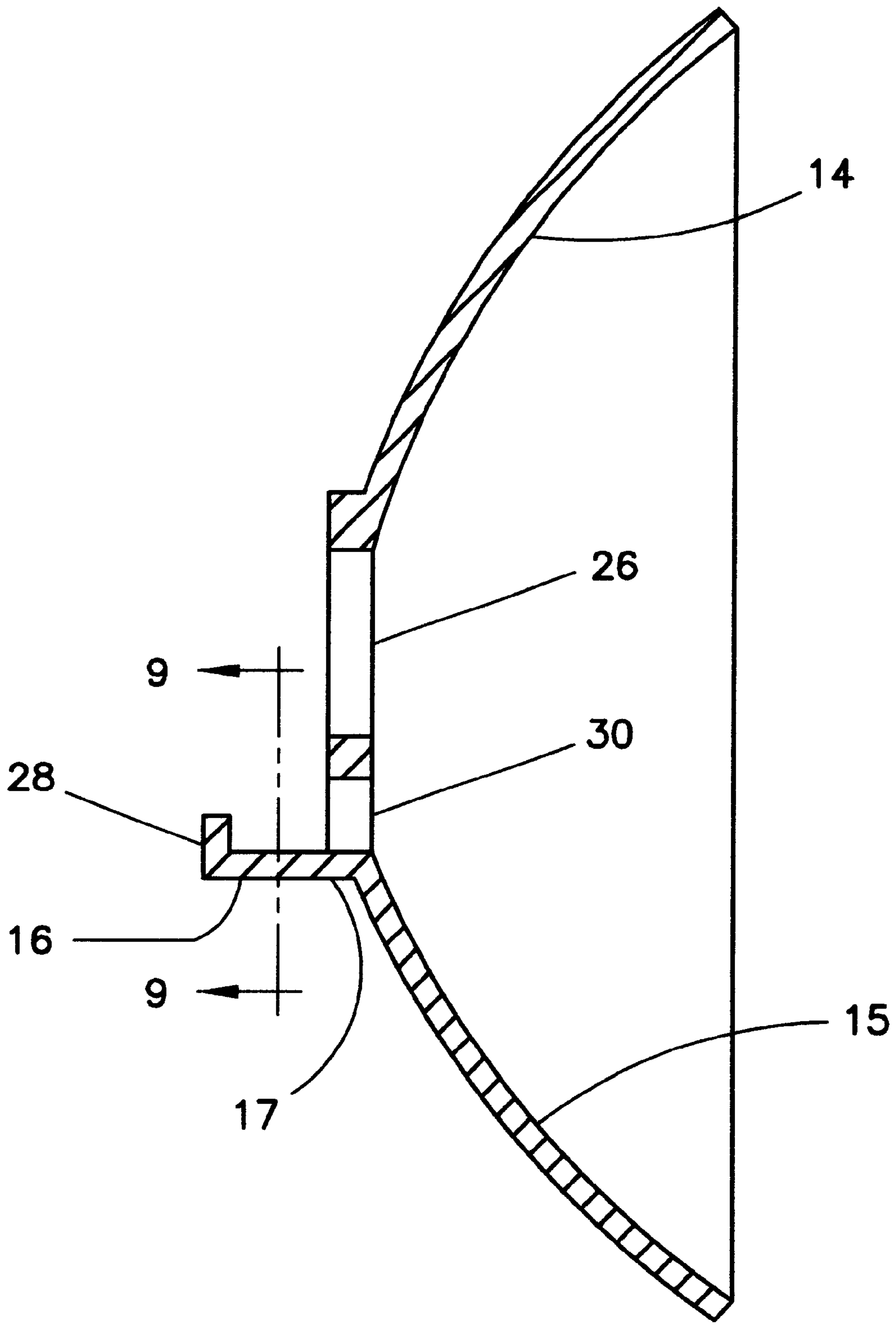
FIG. 3 is a side cross-sectional view of the exemplary embodiment of FIG. 1 taken substantially along line 1—1 in FIG. 8 without an installed bulb assembly.
Figure 6:
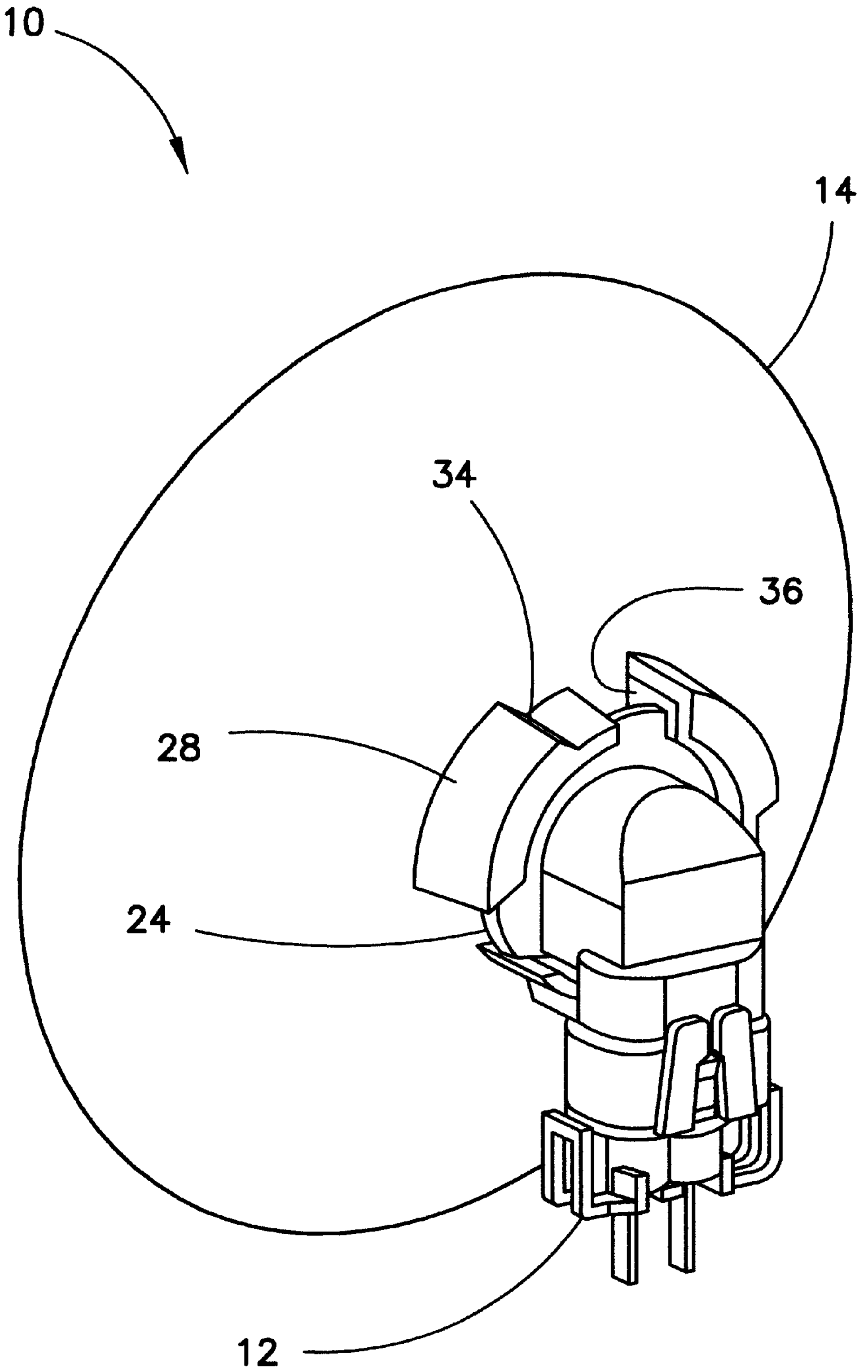
FIG. 6 is a rear perspective view of the exemplary embodiment of FIG. 1 with the bulb assembly initially installed.
Figure 7:
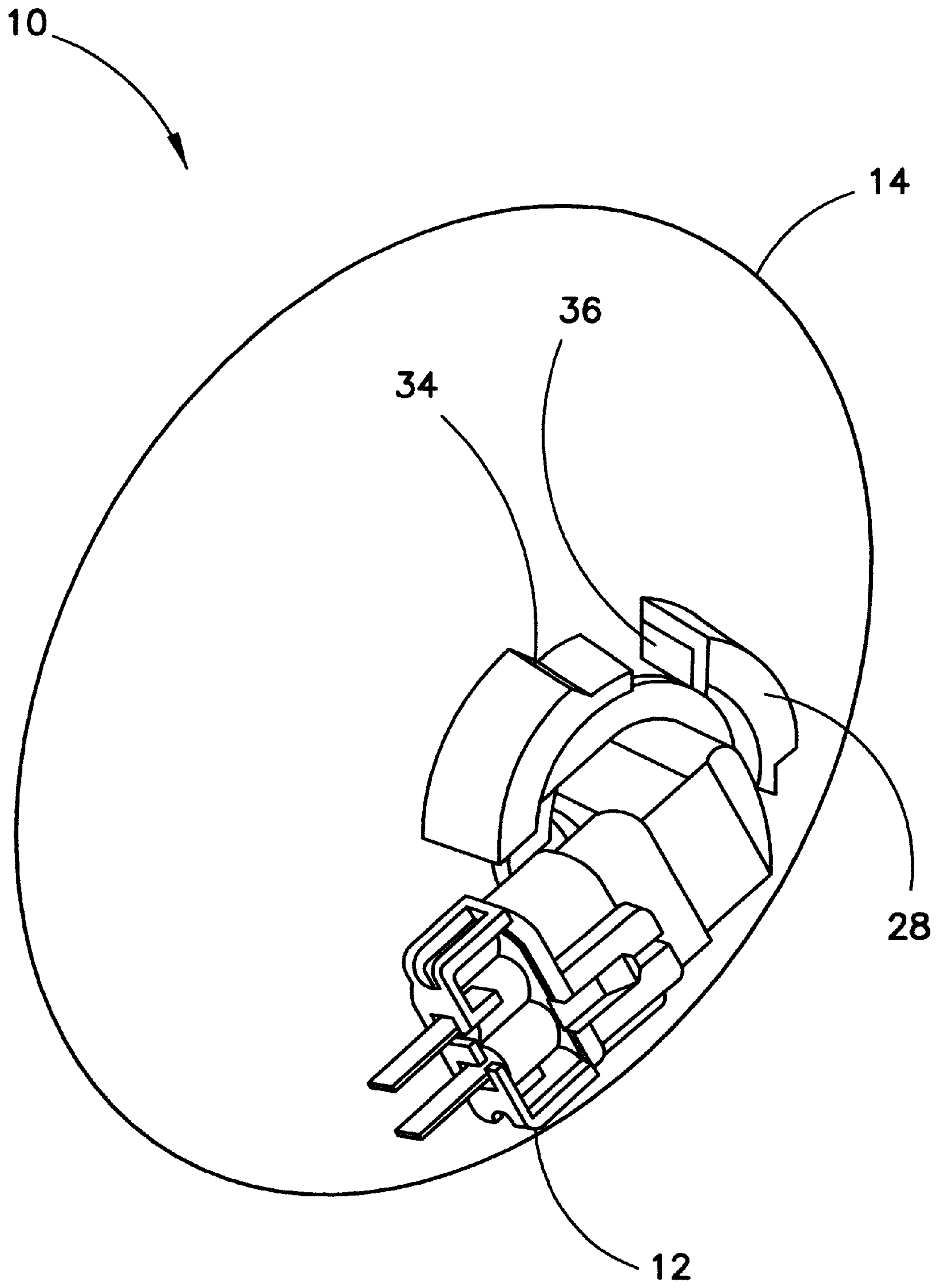
FIG. 7 is a rear perspective view of the exemplary embodiment of FIG. 1 after the bulb assembly has been fully rotated into place.
Figure 8:
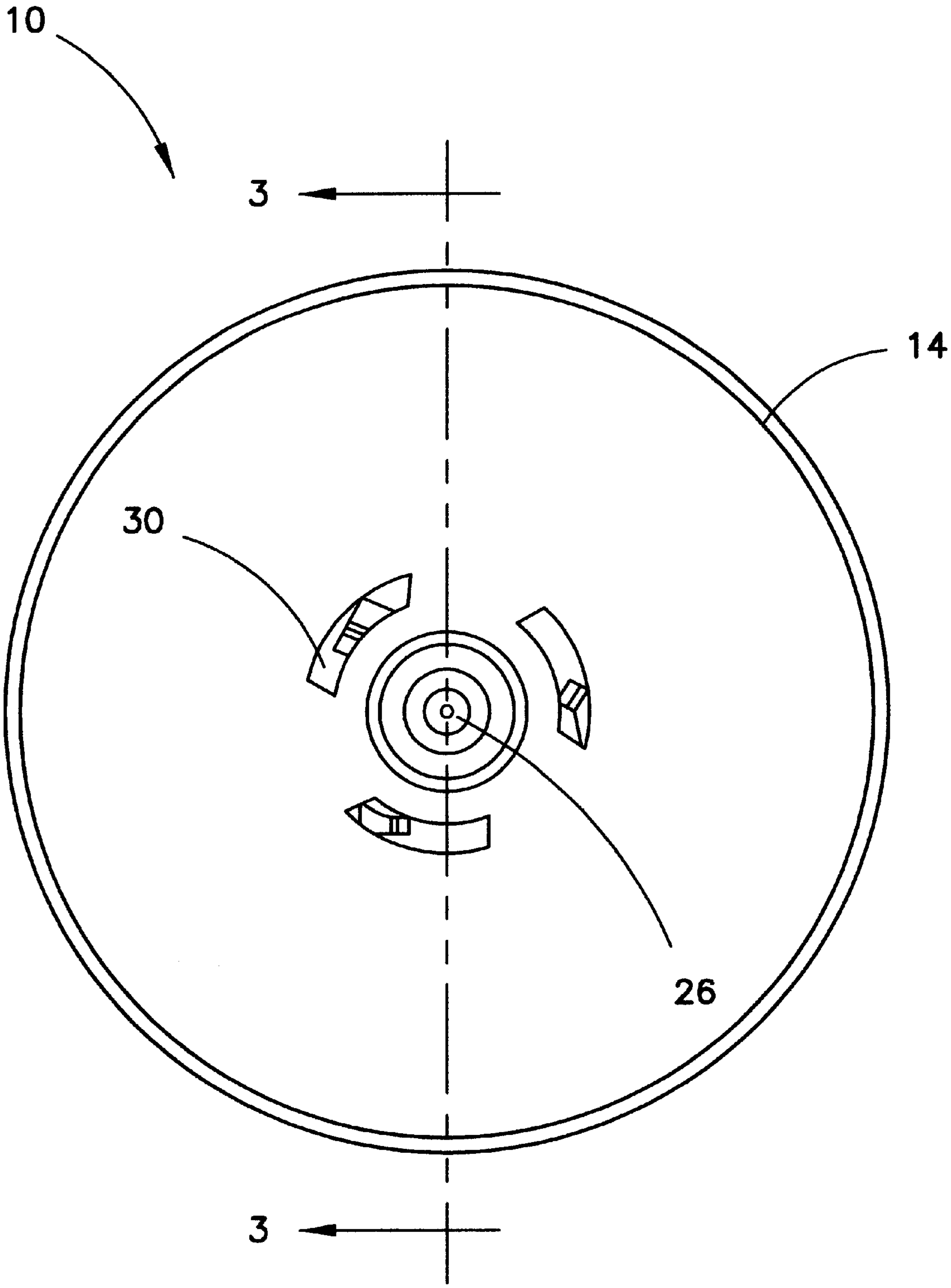
FIG. 8 is a front view of the exemplary embodiment of FIG. 8.

FIG. 3 shows a cross-sectional view of movable reflector 14 without bulb assembly 12 inserted. The body of movable reflector 14 is essentially parabolic in shape to direct light from bulb 18. On the front side 15 of movable reflector 14, an arcuate surface is coated with one of a number of reflective coating compounds known in the art to aid in efficiently directing the light from bulb 18. Like other movable reflectors known in the art, movable reflector 14 has a circular opening, bore 26, positioned at its center for accepting bulb assembly 12 here through. As is shown in FIGS. 3 and 4 through 7, integrally molded on the rear side of movable reflector 14 are three retention arrangements 16 which, in the exemplary embodiment, comprises three walls 17 extending outwardly from the rear surface of reflector 14. Three retainer sections 28 are integrally formed on the ends of wall 17 extending essentially perpendicular to walls 17 and overlying void 30 at the rear side of movable reflector 14. Retainer sections 28 are formed such that they are symmetrically positioned circumferentially around bore 26. Retainer sections 28 are each arcuate in configuration and are generally enclosed on the rear side of movable reflector 14. In contrast, as shown in FIG. 3 and FIG. 8, retainer sections 28 are open to the front side of movable reflector 14 through mold voids 30. While three retainer sections are preferred and are shown in the exemplary embodiment depicted in the Figures, retention arrangement 16 may comprise only two retainer sections 28 or four or more retainer sections 28. Even a single retainer section 28 is feasible. As the number of retainer sections 28 varies, the number of tabs 28 and mold voids 30 will vary to correspond accordingly.

Figure 9:
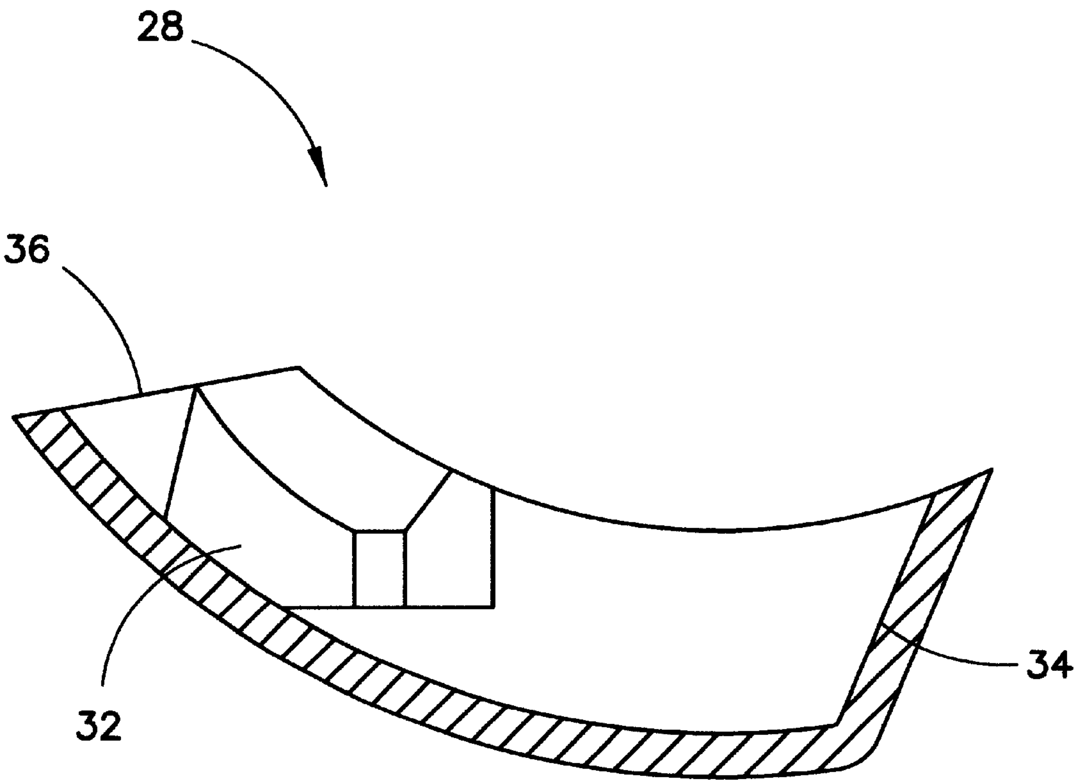
FIG. 9 is a front partially cross section view of a retainer section and ramp molded on the exemplary embodiment of FIG. 3 taken substantially along line 3—3 in FIG. 3.

As shown in FIG. 9, ramp 32 is molded within each retainer section 28 on the side facing the front of movable reflector 14. Also visible in FIG. 9 is molded stop feature 34. Although each retainer section 28 is generally closed on the rear side of movable reflector 14, retainer sections 28 are each formed with a cutout portion 36 for purposes of accommodating tabs 24 of light bulb assembly 12 as shown in FIGS. 6 and 7. Cutout portions 36 are adapted to accommodate the insertion of tabs 24 into the side of retainer sections 28 and to allow tabs 24 to slide sideways under retainer sections 28. Thus, the size and shape of cutout portions 36 assure that bulb assembly 12 is properly received by and rotatably located within bore 26 when manually inserted therein.

Figure 4:
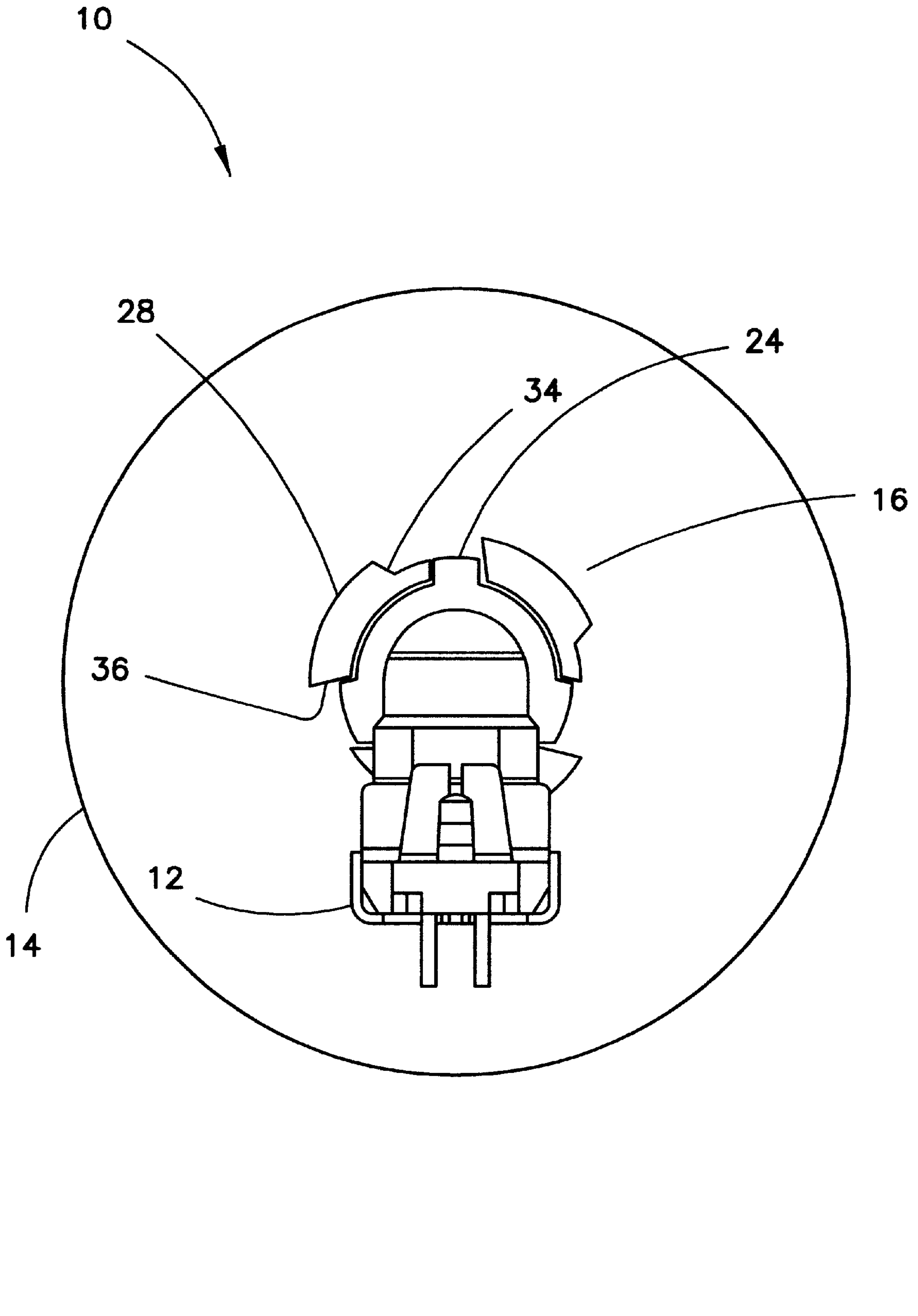
FIG. 4 is a rear view of the exemplary embodiment of FIG. 1 with the bulb assembly initially installed.
Figure 10:
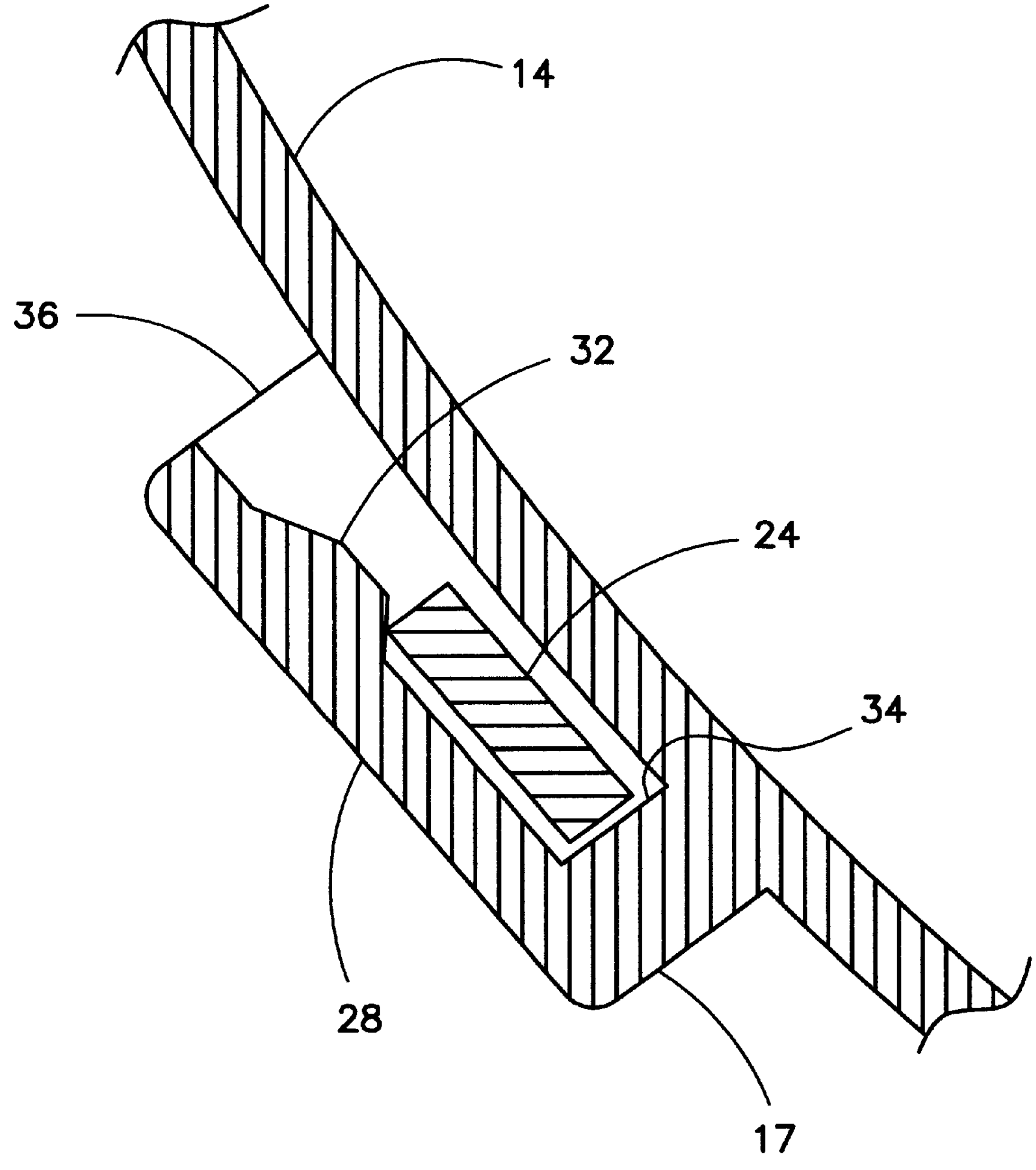
FIG. 10 is a partially fragmentary side view of a retainer section and ramp of the type molded on the exemplary embodiment in FIG. 9 taken sustantially along line 10—10 in FIG. 1.

In operation, when light bulb assembly 12 is initially inserted into bore 26, tabs 24 are aligned in the space between retainer sections 28 and aligned for rotation into cutout portions 36 as shown in FIGS. 4 and 6. Next, light bulb assembly 12 is rotated causing tabs 24 to enter retainer sections 28 through cutout portions 36 and to initially contact corresponding ramps 32, causing the tops of each retainer section 28 in which ramps 32 are formed to flex rearwardly, i.e., away from the rest of movable reflector 14. As best shown in FIG. 10, as light bulb assembly 12 continues to be rotated, each tab 24 will reach and pass over the apex of the corresponding ramp 32, at which time each tab 24 of light bulb assembly 12 "locks" into position and is mechanically retained by ramp 32, molded stop feature 34 and movable reflector 14. At this point, light bulb assembly 12 will be restrained from further rotation due to tabs 24 contacting stop features 34 which are integrally molded as part of the walls of retention arrangement 16 perpendicular to retainer sections 28.

Due to its unique structure, the present invention is particularly suited molding. Indeed, the present invention includes mold voids 30 that align with retainer sections 28 of retention arrangement 16 that allow movable reflector 14 of the present invention to be molded in a simple mold with two halves trapping the plastic part. The dimensions and configuration of mold voids 30 are best understood with reference to FIG. 8, which shows a front view of movable reflector 14 of the present invention. As shown, mold voids 30 are arcuate in configuration and circumferentially and symmetrically spaced around socket bore 26 in positions corresponding to those of retaining sections 28 to allow the molding of the interior of retention sections 28. The present invention can be made in a single injection between two mold halves. The first half of the mold would be generally convex in dimension so as to produce a generally concave reflector and would include one circular protrusion to create bore 26 and arcuate protrusions to mold the features including ramp 32 of each retaining section 28 as illustrated in FIG. 9. These arcuate protrusions would also create mold voids 30. Thus, during the injection molding process, two closed mold halves can produce a mold which is capable of forming all the features of the present invention.

Moreover, the design of the present invention lowers the cost of manufacturing headlamp assemblies in two ways. First, by integrally molding bulb socket retention features on movable reflector 14, the need for a separate retention piece is eliminated. This decreases the number of parts in the manufacture of headlamps, simplifying assembly and decreasing costs. The elimination of additional components also decreases the chance of a manufacturing defect resulting in an overall improvement in quality of the assembled product. Second, as described above, the present invention is preferable to those of the prior art because it allows the piece to be molded in one molding step and does not require additional tool action to manufacture the bulb retention features.

While the present invention has been described in detail with reference to a certain exemplary embodiment thereof, such is offered by way of non-limiting example of the invention, as other versions are possible. It is anticipated that a variety of other modifications and changes will be apparent to those having ordinary skill in the art and that such modifications and changes are intended to be encompassed within the spirit and scope of the invention as defined by the following claims.

What is claimed is:

1. A reflector for use in a reflector aimable vehicle headlamp assembly having a light bulb assembly with at least one tab projecting radially outwardly therefrom, said reflector having a front side and a rear side, and comprising:

a molded body with a bore there through for accepting the light bulb assembly from the rear side of said reflector; and at least one retainer section integrally molded on the rear side of said reflector and arranged adjacent to said bore, each of said at least one retainer sections having a ramp and a stop feature molded there on such that when the light bulb assembly is inserted into said bore and is rotated, each of said at least one retainer sections accepts one of the at least one tabs and upon further rotation the tabs are mechanically retained between said ramps and said stop feature; and said molded body also comprising at least one void there through adjacent said bore and aligned with said at least one retainer section and dimensioned so that said reflector may be molded in one injection molding step using two mold halves.

2. The reflector of claim 1 wherein said molded body has a parabolic shape.

3. The reflector of claim 1 wherein each of said at least one retainer sections is arcuate in configuration.

4. The reflector of claim 1 having three retainer sections integrally molded on the rear side of said reflector.

5. The reflector of claim 4 wherein said three retainer sections are circumferentially and symmetrically arranged adjacent to said bore.

6. The reflector of claim 4 having three voids there through corresponding to each of said three retainer sections.

7. The reflector of claim 1 wherein the front side of said reflector is coated with a reflective compound.

8. The reflector of claim 1 wherein each of said at least one retainer sections further comprises a cutout portion adapted to accommodate insertion of the at least one tab.

9. The reflector of claim 1 wherein said reflector is injection molded in a mold comprising a first half and a second half.

10. The reflector of claim 9 wherein one of said first mold half and second mold half is generally convex in configuration comprising a first protrusion to create said bore and at least one additional protrusion to create said at least one void.

11. A reflector, comprising:

a body having a front side and a rear side, said front side having a reflective surface;

a circular opening through the approximate center of said body, said circular opening adapted to receive a light bulb of a replaceable light bulb assembly, said replaceable light bulb assembly having a socket portion and plurality of tabs projecting radially outwardly from said socket portion;

a plurality of retainer sections integrally molded on said rear side, each of said plurality of retainer sections circumferentially spaced adjacent to said circular opening, each of said plurality of retainer sections comprising a ramp and a stop feature molded therein;

a plurality of voids through said body dimensioned and positioned such that a respective one of said plurality of retainer sections is aligned with and over lies a respective one of said voids so that said headlamp reflector can be injection molded in a single injection molding step.

12. The reflector of claim 11 wherein each ramp of each of said plurality of retainer sections mechanically engages and locks into position a respective one of said plurality of tabs of the replaceable light bulb assembly when the replaceable light bulb assembly is inserted in said circular opening and rotated.

13. The reflector of claim 11 wherein each of said plurality of retainer sections further comprises a cutout portion for receiving said three tabs.

14. The reflector of claim 11 wherein at least one of said plurality of retainer sections further comprises a stop feature.

15. The reflector of claim 11 wherein said body has a parabolic shape.

16. The reflector of claim 11 wherein each of said plurality of retainer sections is arcuate in shape.

17. The reflector of claim 11 wherein said headlamp reflector is injection molded in a mold comprising two mold portions.

18. The reflector of claim 17 wherein one of said mold portions is generally convex in shape comprising a first protrusion to create said opening and a plurality of protrusions to create said plurality of voids.

* * * * *